US005519762A

United States Patent [19]
Bartlett

[11] Patent Number: 5,519,762
[45] Date of Patent: May 21, 1996

[54] ADAPTIVE POWER CYCLING FOR A CORDLESS TELEPHONE

[75] Inventor: Richard A. Bartlett, Middletown, N.J.

[73] Assignee: AT&T Corp., Murray Hill, N.J.

[21] Appl. No.: 360,472

[22] Filed: Dec. 21, 1994

[51] Int. Cl.⁶ .................................................. H04Q 7/20
[52] U.S. Cl. .......................... 379/61; 379/58; 455/38.3; 455/343
[58] Field of Search .............................. 379/58, 61, 62; 455/38.3, 127, 343

[56] References Cited

U.S. PATENT DOCUMENTS

| | | | |
|---|---|---|---|
| 4,731,814 | 3/1988 | Becker et al. | 379/62 |
| 5,128,938 | 7/1992 | Borras | 455/343 |
| 5,237,603 | 8/1993 | Yamagata et al. | 455/38.3 |
| 5,301,225 | 4/1994 | Suzuki | 455/343 |

*Primary Examiner*—Dwayne D. Bost
*Attorney, Agent, or Firm*—Samuel R. Williamson

[57] ABSTRACT

A cordless telephone provides for improved conservation of battery power in a handset unit when this unit is located remote from an associated base unit and in a standby state for a prolonged period of time. While the handset unit is in the standby state for less than a predetermined time period, this unit resides in a low-power monitoring mode which includes deactivating certain internal circuitry and reducing by a first time period the on-time state of other internal circuitry for conserving battery power. After being in the standby state for greater than the predetermined time period, the handset unit continues to reside in the low-power monitoring mode, but further reduces by a second time period the on-time state of the other internal circuitry for greater conservation of battery power. Communications between the handset unit and the base unit is easily reestablished by either one of these units irrespective of the time that the handset unit has been in the standby state.

30 Claims, 4 Drawing Sheets

ADAPTIVE POWER CYCLING FOR A CORDLESS TELEPHONE

BACKGROUND OF THE INVENTION

1. Technical Field

This invention relates to cordless telephones and, more particularly, to a cordless telephone arranged for extending the useful battery life of a handset unit in such telephone.

2. Description of the Prior Art

A typical cordless telephone system includes a handset or remote unit and a base unit. The base unit is connected to the telephone lines and includes an antenna, a transmitter and a receiver for communicating a radio frequency carrier signal that is modulated by switching signals and audio signals to and from the handset unit as appropriate. Power for operation of the base unit is obtained from local line power. The handset unit includes a speaker and a microphone, and also an antenna, a transmitter and a receiver for likewise communicating telephone switching signals and audio signals to and from the base unit. Power for operation of the handset unit is obtained from a battery contained therein. This battery is usually charged by the local line power when the handset unit is placed in a cradle located in the base unit.

In the operation of a typical cordless telephone handset unit in originating and receiving a call, the receiver of the handset unit normally remains in an on-condition whenever the handset unit is removed from the base unit. If a user desires to place a call from the handset unit, the transmitter in the handset unit generates a control signal that is transmitted to the base unit. Upon receipt and detection of the control signal, the base unit seizes the telephone lines so as to enable audio signals and switching signals from the handset unit that are received by the base unit within a given audio frequency band to be passed on to the telephone lines. If an incoming telephone ringing signal is sensed by the base unit, reflecting an incoming call, the base unit, in turn, transmits this ringing signal to the handset unit where it is detected by the handset unit receiver which activates a ringer in the handset unit.

High battery drain current limits the period of time for reliable operation of handset units while located remote from associated base units. In order to extend this time and yet insure reliable operation for an extended period, one specific arrangement, disclosed in U.S. Pat. No. 4,731,814 and issued to W. R. Becker et al. on Mar. 15, 1988, reduces the battery drain current in the handset unit when the telephone is not in use and the handset unit is on-hook, i.e., no telephone call is in progress. Operation of the handset unit is through a process wherein power to the transmitter in the handset unit is removed and power to the receiver and other selected circuitry in the handset unit is controlled to minimize power consumption when the handset unit is located remote from the base unit and also monitoring for a telephone ring signal from the base unit.

Control of the power to the receiver and the other selected circuitry in the handset unit of the Becker et al. arrangement is achieved by cycling the power to these circuits on and off while the handset unit is in a standby state. And the handset unit only responds to a ringing signal received from the base unit that is accompanied by an identification code that the handset unit recognizes.

While this type of arrangement in a cordless telephone system has been generally satisfactory in the past, it is now technically feasible and desirable to provide a cordless telephone that provides a further increase in battery life while remaining inexpensive and easy to operate.

SUMMARY OF THE INVENTION

In accordance with the invention, a cordless telephone provides for conserving battery power in an associated handset unit when this unit is located remote from an associated base unit and in a standby state.

In accordance with a feature of the invention, while in the standby state for less than a predetermined time period, the handset unit resides in a low-power monitoring mode which includes deactivating certain internal circuitry and reducing by a first time period the on-time state of other internal circuitry for conserving battery power. After being in the standby state for greater than the predetermined time period, the handset unit continues to reside in the low-power monitoring mode, but further reduces by a second time period the on-time state of the other internal circuitry for greater conservation of battery power. Communications between the handset unit and the base unit is easily reestablished by either one of these units irrespective of the time that the handset unit has been in the standby state.

BRIEF DESCRIPTION OF THE DRAWING

This invention and its mode of operation will be more clearly understood from the following detailed description when read with the appended drawing in which.

Throughout the drawing, the same element when shown in more that one figure is designated by the same reference numeral.

DETAILED DESCRIPTION

Figure 1:
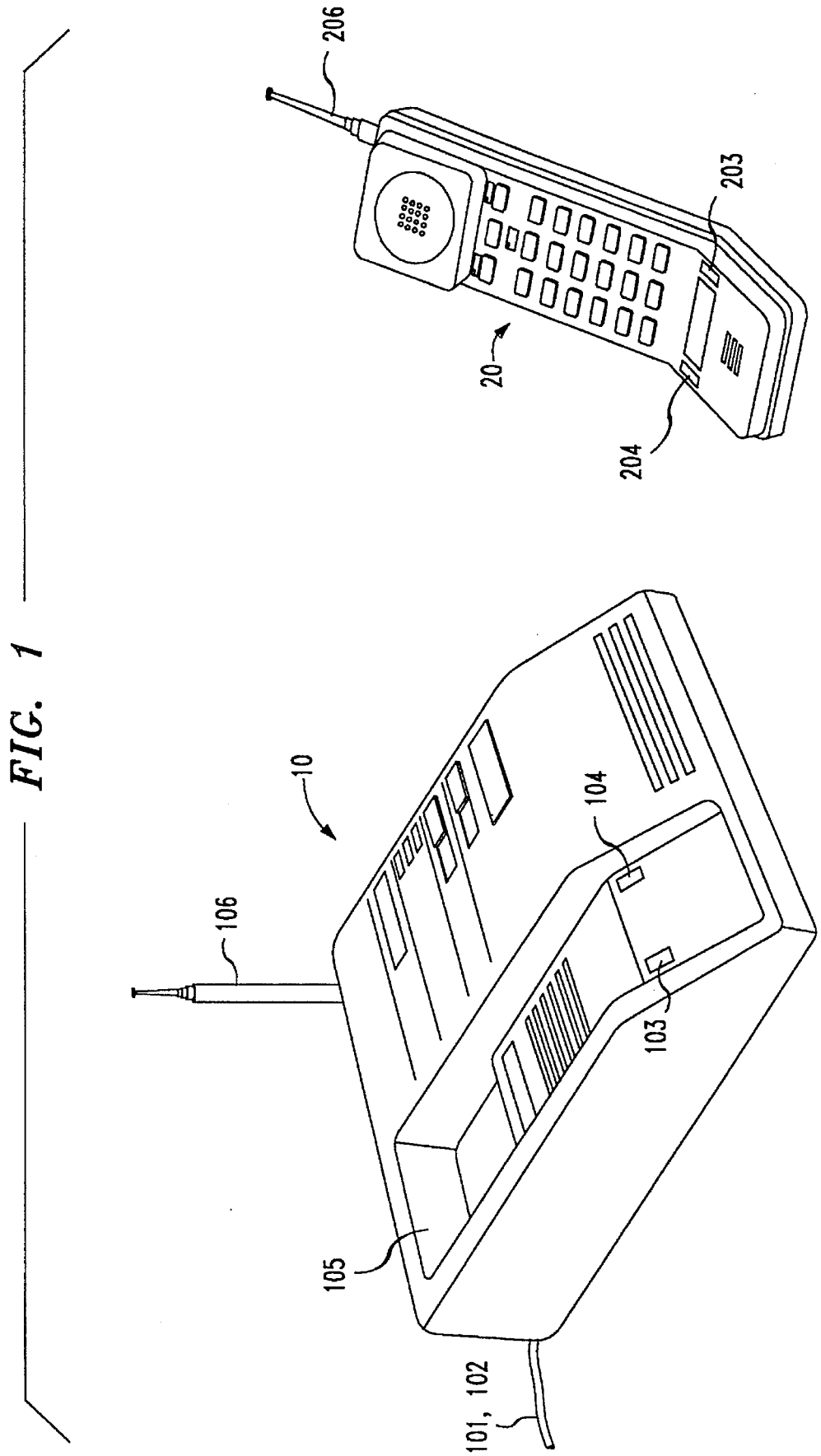
FIG. 1 shows perspective views of both a cordless telephone base unit and a portable unit with which it communicates and to which the present invention may be applied.

Referring now to FIG. 1, there is shown a portable transceiver or battery operated device along with a fixed station with which it communicates. As illustrated, the portable transceiver may comprise a handset unit 20, and the fixed station may comprise a base unit 10 of a cordless telephone communication system to which the present invention may be applied.

In the operation of this communication system, the base unit 10 transmits to and receives signals from the handset unit 20 over an antenna 106 and couples these signals onto a telephone line 101, 102. The handset unit similarly transmits and receives signals over an antenna 206 and is initially used to contact the base unit for enabling the placing of a call over the telephone line 101,102. In order to prevent an unauthorized user in possession of a handset unit from obtaining dial tone from the base unit, a randomly generated security code stored in the base unit 10 is transferred to the handset unit 20 while the handset unit is located in a mating cradle 105 in the base unit 10. A battery, which allows operation of the handset unit 20 while remote from the base unit 10, is normally charged when the handset unit 20 is placed in the base unit charging cradle 105. This battery is described later herein with reference to FIG. 2. A direct-current charging path for the battery is established over contacts 103 and 104 in the base unit 10 and contacts 203 and 204 in the handset unit 20 for charging of the battery. These contacts also allow transfer circuits in the base unit 10 and the handset unit 20 to respectively transmit and receive the security code and also an operating frequency channel over this path. A format suitable for transferring of the security code and other data over a direct-current charging path is described in U.S. Pat. No. 4,736,404 issued to R. E. Anglikowski et al. on Apr. 5, 1988.

In the handset unit 20, a controlled power-up/power-down mode of operation is implemented. Power to a radio receiver, a control unit and certain other selected circuitry in the handset unit 20 are controlled to minimize power consumption when the handset unit 20 is in a standby-and-out-of-cradle state. The handset unit 20 resides in this state while not being used by a user in communicating with the base unit 10. Power to other non-essential circuitry in the handset unit is turned completely off during this power saving state.

During the power-up/power-down (battery saver) mode of operation, multiple events can cause the control unit to turn on to a full operating mode from the alternating power-up/power-down mode. A key depression on the handset unit, detection of a digitally formatted radio signal transmitted from the base unit 10, and the handset unit 20 being cradled in the base unit 10 for charging are all events which cause the control unit in the handset unit 20 to turn on to and remain in the full operating mode until processing of these events is completed.

A message format for the radio signals transmitted between the base unit and the handset unit is provided in the form of frequency shift keyed (FSK) signals and includes a data field. This data field may be in the form of either command opcode data or dial digit data, thereby allowing for many different commands or functions. The message format also includes a synchronizing header signal that immediately precedes the data field. A format suitable for transmission of the data messages between the base unit 10 and the handset unit 20 is described in U.S. Pat. No. 4,731,814 which issued to W. R. Becker et al. on Mar. 15, 1988.

Any communications between the base unit and the handset unit are established first through interpretation of the data field in the FSK signals. By way of example, when the base unit receives the incoming ringing signal on the telephone lines, it transmits the FSK signal with the ring-on opcode to the handset unit for changing the handset unit 20 from the alternating power-up/power-down mode to the full operating mode. But before the handset unit will respond to the base unit, a security code that the handset unit recognizes also must be in the data field received by the handset unit.

When a signal is transmitted on the frequency on which the handset unit 20 is monitoring, the handset unit receiver turns on and remains on long enough to receive and interpret the security code transmitted by a base unit on this frequency. The security code identifies the transmitting base unit as being the correct base unit to which the handset unit should respond. All other signals received on this frequency without a security code that the handset unit recognizes are ignored. Once the handset unit has verified that the signaling base unit has the proper security code, it turns on to a full operating mode, in this instance the PHONE mode. If the handset unit does not recognize the code being transmitted by the base unit, it leaves the full operating mode and returns to the power-up/power-down mode of operation. This common security code is also included in any transmission of the FSK signals from the handset unit to the base unit and must similarly identify the handset unit as being the correct handset unit to which the base unit should respond. The handset unit receiver also remains on for approximately 10 seconds whenever a user goes on-hook, i.e., terminates a call while in the PHONE mode or INTERCOM mode.

Figure 2:
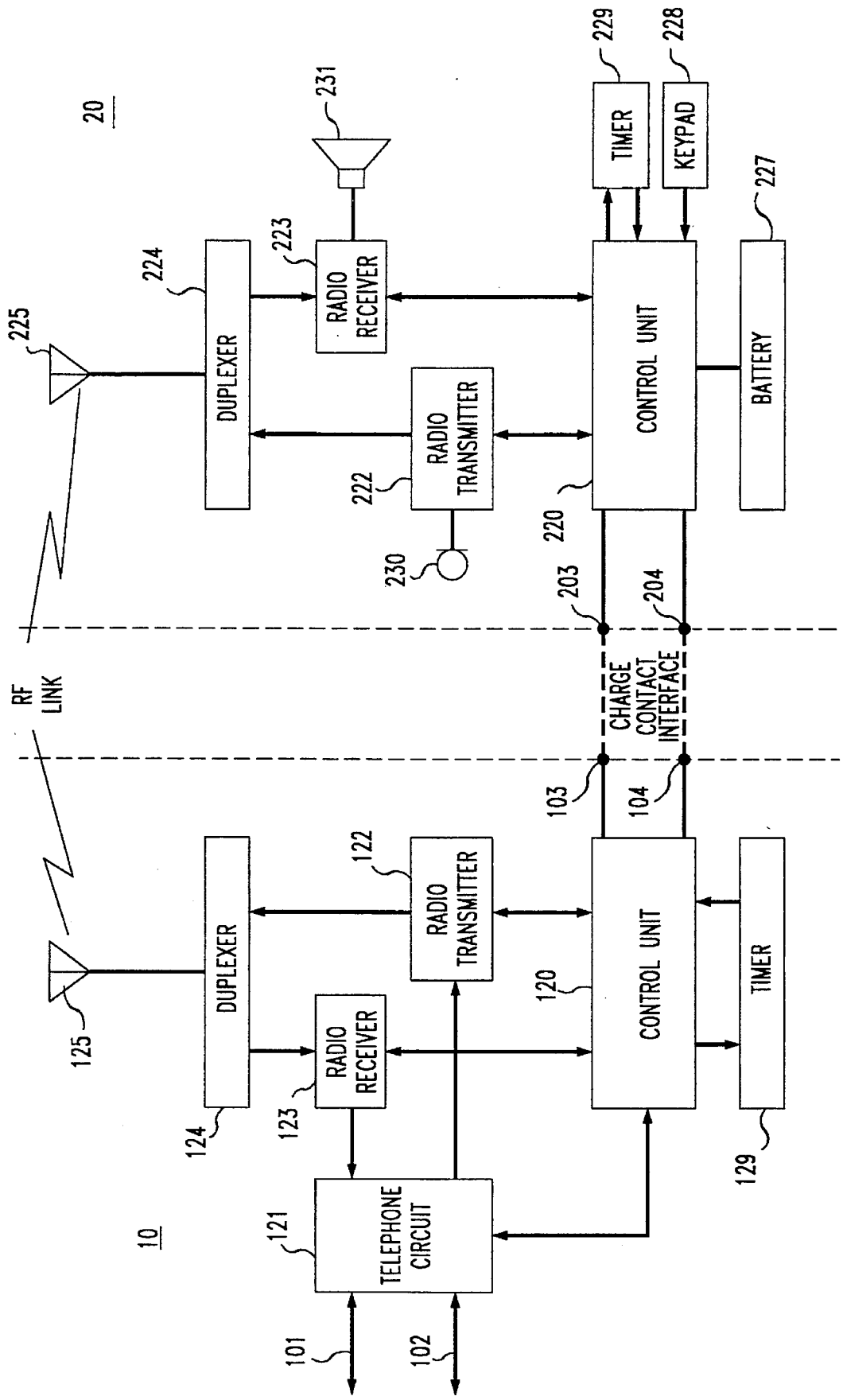
FIG. 2 is a functional block representation of the cordless telephone base unit and portable unit of FIG. 1 both operative in accordance with the principles of the present invention.

Referring next to FIG. 2, there is shown a block representation of the major functional components of the base unit 10 and the handset unit 20, both depicted in FIG. 1 and operative over a plurality of communication channels.

Included in the base unit 10 is a control unit 120 which advantageously provides a number of control functions. In accordance with the disclosed embodiment, the control unit 120 provides control signals such as clear and restart to a timer 129 and also receives input as to the time accumulated in this timer. This timer 129 measures a period of time over which the handset unit is continually configured in the standby state.

The control unit 120 also generates security code and frequency channel data, which includes data indicative of an active channel selected by the base unit 10 and initially communicated to the handset unit 20 over the charge contact interface 103, 104, 203, and 204 or subsequently over the radio frequency (RF) link as needed to avoid interference. An arrangement suitable for use in selecting an active channel free of interference is described in U.S. Pat. No. 5,044,010 which issued to R. Frenkiel on Aug. 27, 1991, this patent being incorporated herein by reference.

The security code data, transmitted from the base unit 10 to the handset unit 20 via the battery charge contact interface, is also transmitted while establishing initial communications or call set-up during the time that the handset unit 20 is located remote from the base unit 10 as well as during the transfer of subsequent opcode data between these units during ongoing communications. This control unit 120 compares the received security code data with its stored security code data during the establishing of the two-way RF communications link between the handset unit 20 and the base unit 10. A favorable comparison of the data from the two security codes must be achieved in order for the base unit 10 to respond to a request-for-service signal from a handset unit. This control unit 120 also receives and processes opcode data provided by the handset unit 20 for dialing and providing signaling information out to a central office or other appropriate switch via a telephone circuit 121 and over tip-ring lines 101 and 102. Control unit 120 may be implemented through the use of a microcomputer containing ROM, RAM and through use of the proper coding. Such a microcomputer is known in the art and is readily available from semiconductor manufacturers such as Signetics, Intel and AMD. The telephone circuit 121 serves as a "plain old telephone service" (POTS) interface for voice signals on the tip-ring lines 101 and 102 which are sent to radio transmitter 122 and received from radio receiver 123. A conventional power supply (not shown) provides operating power for all of the circuitry in the base unit 10.

Both the base unit 10 and the handset unit 20 are operable on a plurality of communication channels. The control unit 120 configures the radio transmitter 122 and the radio receiver 123 in the base unit 10 for proper operation on the active one of the plurality of channels when communicating with handset unit 20.

The transmit and receive signals of the base unit 10 are coupled to a duplexer 124 which permits the radio transmitter 122 and the radio receiver 123 to both simultaneously operate over antenna 125 while preventing the output of transmitter 122 from being coupled directly to the input of the receiver 123. When the base unit is in an idle state awaiting an incoming telephone call or a request-for-service signal from a handset unit, transmitter 122 is turned off while receiver 123 remains on to detect the request-for-service signal.

Referring next to the handset unit 20, there is shown the control unit 220 which stores the security code data that is generated by the base unit 10 and provided to the handset unit 20. This security code data stored in control unit 220 is transmitted from the handset unit 20 to the base unit 10 while establishing initial communications through a request for service signal as well as during the transfer of subsequent opcode data to the base unit. These signals are transmitted in a frequency shift keying (FSK) format and include a synchronizing signal immediately followed by a data field which includes the security code generated by the control unit 120. Like the control unit 120, this control unit 220 may be implemented through the use of a microcomputer containing ROM, RAM and through use of the proper coding. Such a microcomputer is known in the art and is readily available from semiconductor manufacturers such as Signetics, Intel and AMD.

Communications with the base unit 10 are provided via a radio transmitter 222 and a radio receiver 223 in the handset unit 20. The output of the transmitter 222 and input for the receiver 223 are commonly coupled through a duplexer 224 to an antenna 225. The receiver 223 demodulates voice signals transmitted by the base unit 10 and couples these signals to an acoustical device such as, for example, loudspeaker 231. The transmitter 222 has as its input speech signals from a microphone 230, security code data from control unit 220, and opcode data representative of entries on a keypad 228, all of which it transmits to the base unit 10. The keypad 228 is used for entering dial digits and control functions executable by the control unit 220 or transmitted to the base unit 10. A battery 227 is also included in the handset unit 20 for providing operating power for all circuitry in this unit.

A timer 229 is connected to the control unit 220 and provides input to the control unit as to the length of time accumulated therein. The control unit provides control signals such as clear and restart to this timer. This timer 229 measures a period of time over which the handset unit is continually configured in the standby state.

In order to conserve battery power, a controlled power-up/power-down mode of operation for the handset unit 20 is implemented in accordance with the teachings of U.S. Pat. No. 4,731,814 issued to W. R. Becker et al. The battery 227 in the handset unit 20 is normally charged while the handset unit is placed in the cradle of the base unit. When the handset unit is removed from the base unit and is in an idle or standby state awaiting a telephone call, power to the control unit 220, receiver 223 and certain other selected circuitry in the handset unit 20 is controlled to minimize power consumption. Power to other non-essential circuitry in the handset unit 20 is turned completely off during this state. The handset unit automatically turns on to a full operating mode from the controlled power-up/power-down mode in response to events such as a user depressing a key on the keypad 228 or the receipt of a ring indication from a base unit, the ring indication being indicative of an incoming call directed to the handset unit.

Figure 3A:
FIGS. 3A through 3D shows timing diagrams for illustrating the adaptive power cycling operation of the cordless telephone in accordance with the invention.
Figure 3B:

Referring next to FIG. 3A, there is shown a pair of timing diagrams for illustrating the operation of the cordless telephone system in providing increased battery life through use of a first and a second power-up/power-down mode of operation for the handset unit. The timing for transmission of a message format from the base unit (BASE) is identified in this figure, and the timing for activation of the handset unit (HANDSET) for receipt of this message format is also identified in this figure.

The format for transmission of the RF messages between the base unit and handset unit are the same irrespective of the direction of the message, with the exception of a preamble or header used by the base unit initially to preface command messages in the standby-and-out-of-cradle state. The header is not included, however, when signaling is initiated from the handset unit to the base unit. The first header signal, shown in FIG. 3A with a period length 32, is approximately 575 milliseconds in length and comprises alternating 2.5 millisecond marks and spaces transmitted prior to a synchronization period and data field. The synchronization period is 16.5 milliseconds in length and is immediately followed by a 21-bit (36.75 millisecond) data field.

The data field may be comprised of either command opcode data or dial digit data. The 21 bits of the opcode data comprise a 16-bit security code, a 4-bit opcode and a single EVEN parity bit. The opcode data field comprises the digital command information codes, except those containing dial digit data. The 21 bits of the dial digit data field are comprised of the leading 12 bits of the security code, a 4-bit representation of the number to be dialed, an opcode of F-hex to indicate that dial digit data is contained therein and a single EVEN parity bit.

As shown in the first timing diagram of FIGS. 3A and B, a first header signal with a period length 32 is employed in accordance with the disclosed embodiment. Period length 32 is approximately 575 milliseconds. Power to the receiver 223 in the handset unit is provided in power-on cycles 31 and 33, both occurring over a period length of approximately 30 milliseconds for detecting this first header signal. During each power-on cycle, the receiver 223 is turned on to detect the first header signal transmitted by the base unit 10. If a signal is not detected, the control unit 220 in the handset unit turns off the power to the receiver for a power-off cycle having a period length of approximately 430 milliseconds. The receiver 223 is turned on either by the control unit after 430 milliseconds have elapsed, or by a button press on the keypad or an in-cradle detection signal. If at some point after any power-on cycle of the handset unit, the base unit starts to transmit the first header signal, the handset receiver will turn on with a power-on cycle in time to detect transmission of this first header. In order to insure that each transmitted header is detected, the length of each power-off cycle for the handset unit receiver is designed such that the first header signal bridges across two power-on cycles.

In order to reduce the current drain on the battery in the handset unit, which occurs while the handset unit is located remote from the base unit and in a standby state wherein no user initiated communications exists between the base unit and the handset unit, an increase in the length of the power-off cycle for the handset unit is provided. In order for the base unit to accommodate this lengthened power-off cycle and insure that the handset unit always receives the header signal from the base unit, the header signal provided by the base unit is, similarly, lengthened.

To insure that the base unit and the handset unit respectively switch from the shorter to longer header signal and power-off cycles synchronously, timer circuit 129 in the base unit and timer circuit 229 in the handset unit both measure a period of time for which the handset unit is continually in the standby state. If such period of time for the handset unit is, by way of example, less than "N" hours which is illustratively selected as 24 hours, then the control units 120 and 220 continue to respectively use the shorter header signal and power-off cycle. On the other hand, once the period of time in which the handset unit has been in the standby state exceeds N hours, then the control units 120 and 220 respectively switch to the longer header signal and power-off cycle. Although 24 hours have been illustratively selected as the time after which the handset unit and base unit switch to the longer header signal and power-off cycle, it is to be understood that other times, shorter and longer, may be selected and are anticipated.

In order to insure that the timer circuit 129 in the base unit and the timer circuit 229 in the handset unit respectively configure the base unit and the handset unit in a timely manner, precision oscillators may be employed in these timer circuits. These precision oscillators insure that the timer circuits both reach a predetermined time period, e.g., 24 hours, at exactly the same time. As an inexpensive alternative, however, simple non-precision oscillators may be employed in these timer circuits. To ensure proper operation using such non-precision oscillators in the timer circuits, the time selected for the handset unit to switch from the shorter to the longer power-off cycle is set at some time which occurs later than the time set for the base unit to switch to its longer header signal. By way of example, if the timer circuit 129 in the base unit is set such that the base unit switches from the shorter to the longer header signal after approximately 24 hours, then the timer circuit 229 in the handset unit may be set such that the handset unit switches from the shorter to the longer power-off cycle after approximately 25 hours. This guarantees that the handset unit will be configured with a power-on cycle appropriate for receiving either of the transmitted header signals while the base unit transitions from the short to the longer header signal. Thus, even though inexpensive, non-precision oscillators are used, the handset unit is arrangeable to clearly and reliably bridge across the shorter header signal as well as the longer header signal when the time of transition between these two header signals is not clearly defined.

Unless the handset unit turns on to a full operate mode, i.e., communicates with the base unit, from the alternating power-up/power-down mode, both timer circuits 129 and 226 continue their respective counts in accumulating measured time and are not cleared. Thus, although the receiver in the handset unit may be activated by other cordless telephones in its reception range transmitting a modulated carrier on the frequency to which the receiver is then tuned, or any source of noise occurring at this carrier frequency, such false activation signals advantageously do not affect the timer circuits 129 and 226.

Figure 3C:
Figure 3D:
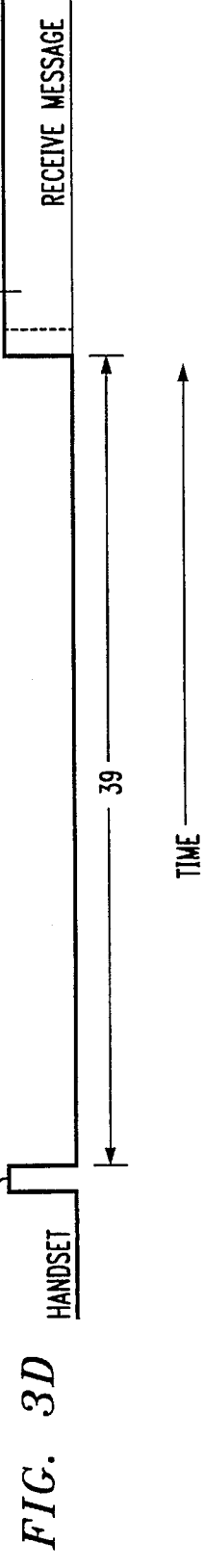

As shown in the second timing diagram of FIGS. 3C and 3D, a second header signal with a period length 37 is employed in accordance with the disclosed embodiment. Period length 37 is approximately 1,150 milliseconds.

Power to the receiver 223 in the handset unit 20 is provided in power-on cycles 36 and 38, both occurring over a period length of approximately 30 milliseconds for detecting this second header signal. During each power-on cycle, the receiver 223 is turned on to detect the second header signal that is transmitted by the base unit with the period length 37. If this second header signal is not detected, the control unit 220 in the handset unit turns off the power to the receiver for a power-off cycle having a period length 39 of approximately 860 milliseconds, as shown in FIG. 3D. After 860 milliseconds have elapsed, the receiver 223 is turned on once again by the control unit for detecting the signal header. If, at some point after any power on-cycle of the handset unit, the base unit starts to transmit the second header signal, the handset unit receiver will turn on with another power-on cycle, as illustrated by power-on cycle 38, in time to detect transmission of this second header signal. In order to insure that each transmitted header is detected, the length of each power off-cycle for the receiver of the handset unit is designed such that the second header signal bridges across two of the second longer power-on cycles.

Figure 4:
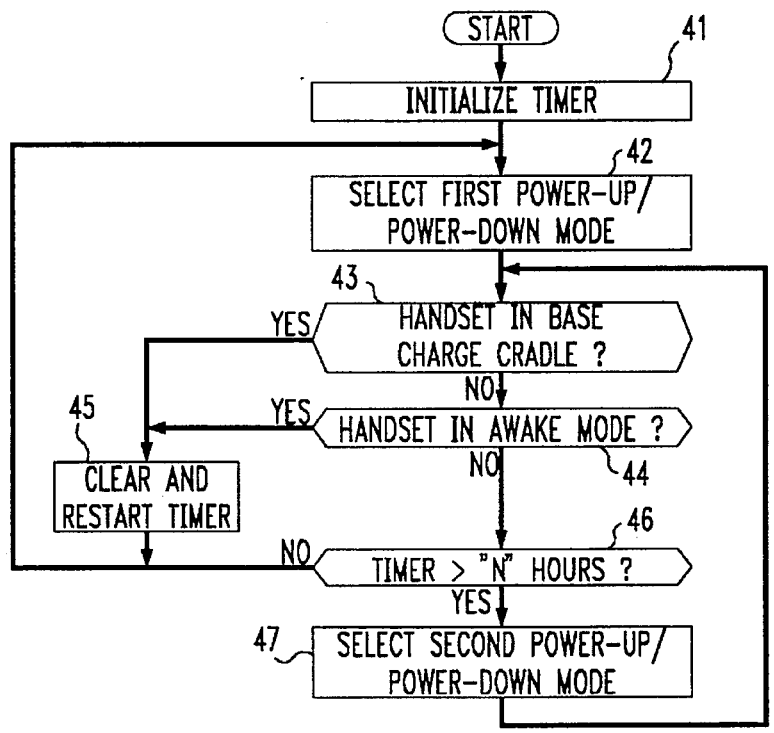
FIG. 4 shows a flow chart for illustrating the operation of the cordless telephone with the desired functionality in adjusting the power cycling of the handset unit between a first and a second power-up/power-down operating mode.

Referring next to FIG. 4 there is shown a flow chart for illustrating the operation of the cordless telephone with the desired functionality in adjusting the power cycling of the handset unit 20 between a first and a second power-up/power-down operating mode. The functions in this flow chart are advantageously provided by a process or program stored in ROM contained in control unit 220.

The process is entered in step 41 where the timer 229 is initialized. From this step, the process advances to step 42 where the handset unit configured in the first power-up/power-down mode. From step 42, the process advances to decision 43 where a determination is made as to whether the handset unit is then located in the base charge cradle. If the handset unit is not in the base charge cradle, the process advances to decision 44 where a determination is made as to whether the handset unit is in the AWAKE mode. While in the AWAKE mode, the handset unit is considered to be in the full operating mode and is generally either in the PHONE or INTERCOM mode communicating with the base unit. Both the receiver and the transmitter of the handset unit are active while the handset unit is in the AWAKE mode.

From either decision 43 or decision 44, the process advances to step 45 where any time accumulated on the timer is cleared and the timer restarted at zero time. From step 45, the process returns to step 42.

If at decision 44 the handset unit is not in the AWAKE mode, the process advances to decision 46 where a determination is made as to whether the time accumulated on the timer is in excess of N hours, illustratively described herein as 24 hours. If the time accumulated on the timer is less than N hours, the process returns to decision 42. If, however, the time accumulated on the timer is greater than N hours, the process advances to step 47 where the second power-up/power-down mode of operating is selected. From step 47, the process returns to the decision 43.

Figure 5:
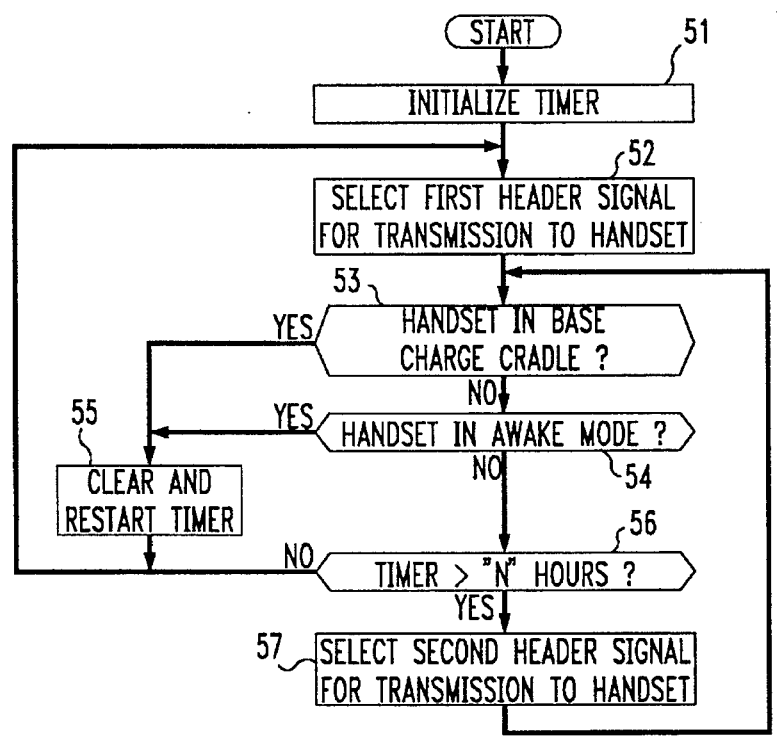
FIG. 5 shows a flow chart for illustrating the operation of the base unit with the desired functionality in selecting either a first header signal or a second header signal for transmission to the handset unit.

Referring next to FIG. 5, there is shown a flow chart illustrating the operation of the base unit 10 with the desired functionality in selecting either a first header signal or a second header signal for transmission to the handset unit. The second header signal has a length considerably longer than the first header signal. The functions in this flow chart are advantageously provided by a process or program stored in ROM contained in control unit 120.

The process is entered in step 51 where the timer 129 in the base unit is initialized. From step 51, the process advances to step 52 where the base unit is configured for providing the first header signal to the handset unit. From step 52, the process advances to decision 53 where a determination is made as to whether the handset unit is then located in the base charge cradle. If the handset unit is not in the base charge cradle, the process advances to decision 54 where a determination is made as to whether the handset unit is in the AWAKE mode. This determination is easily made in the base unit since any communications by the handset while in the full operating mode will be made with the base unit.

From either decision 53 or decision 54, the process advances to step 55 where any time accumulated on the timer is cleared and the timer restarted at zero time. From step 55, the process returns to step 52.

If at decision 54 the handset unit is not in the AWAKE mode, the process advances to decision 56 where a determination is made as to whether the time accumulated on the timer is in excess of N hours. If the time accumulated on the timer is less than N hours, the process returns to decision 52. If, however, the time accumulated on the timer is greater than N hours, the process advances to step 57 where the second header signal is selected for transmission to the handset unit. From step 57, the process returns to decision 53 where it continues to monitor whether the handset unit is in the base charge cradle and to step 54 where it determines whether the handset unit is in the AWAKE mode.

Various modifications of this invention are contemplated and may obviously be resorted to by those skilled in the art. By way of example, the cordless telephone system described earlier herein may be easily modified to include a third and even a fourth power-off cycle for the handset unit, these power-off cycles having increasingly longer period lengths. And the base unit would be configured to include corresponding increasingly longer header signals for use with the time dependent power-off cycles selected in the handset unit. Thus, it is to be understood that other modifications of this invention may be resorted to by those skilled in the art without departing from the spirit and scope of the invention as hereinafter defined by the appended claims.

I claim:

1. A cordless telephone comprising:

a base unit with a first transmitter and a first receiver;

a handset unit with a second transmitter and a second receiver for respectively transmitting to the first receiver and receiving from the first transmitter in the base unit;

control means for deactivating the second transmitter and reducing an on-time state of the second receiver while the handset unit is located remote from the base unit and in a standby state wherein no user initiated communications exists between the base unit and the handset unit; and timer means for measuring a period of time for which said handset unit is continually in the standby state, in response to said measured time period being less than a predetermined first time period, the control means deactivating the second transmitter and cycling between the on-time state and an off-time state of the second receiver for a predetermined third time period, and in response to said measured time period being greater than the predetermined first time period, the control means deactivating the second transmitter and cycling between the on-time state and the off-time state of the second receiver for a predetermined fourth time period, said fourth time period being greater than said third time period.

2. The cordless telephone of claim 1 further including coding means for storing a coding signal in the base unit and the handset unit of the cordless telephone and for transmission between the base unit and the handset unit in response to user initiated communications, the handset unit being unresponsive to user initiated communication attempts by the base unit unaccompanied by the coding signal and remaining in the reduced on-time state, and the base unit being unresponsive to user initiated communication attempts from the handset unit unaccompanied by the coding signal.

3. The cordless telephone of claim 2 wherein in response to user initiated communications at the handset unit, the second receiver changes from a reduced on-time state to a full-on operating state.

4. The cordless telephone of claim 3 wherein the control means for deactivating the second transmitter and reducing the on-time state of the second receiver comprises a computer, the computer also reducing its on-time state when the handset unit is in the standby state and changing to a full-on operating state in response to user initiated communications.

5. The cordless telephone of claim 4 wherein the second transmitter is operatively responsive to the computer in changing from a deactivated state to a full-on operating state in response to user initiated communications at the handset unit.

6. The cordless telephone of claim 2 wherein in response to user initiated communications at the base unit, the first transmitter provides the coding signal to the second receiver and upon receipt of the coding signal the second receiver changes from a reduced on-time state to a full-on operating state.

7. The cordless telephone of claim 6 wherein in response to user initiated communications at the base unit, the second transmitter changes from a deactivated state to a full-on operating state.

8. The cordless telephone of claim 1 wherein the control means further includes means responsive to user initiated communications at the base unit for establishing communications with the handset unit while said handset unit is in the standby state, in response to said measured time period being less than the predetermined first time period, the control means causing said first transmitter to transmit a first header signal having a first period length, and in response to said measured time period being greater than the predetermined first time period, the control means causing said first transmitter to transmit a second header signal having a second period length, said second period length of said second header signal being greater than said first period length of said first header signal.

9. A method of communicating with a cordless telephone having a base unit with a first transmitter and a first receiver, and a handset unit with a second transmitter and a second receiver for respectively transmitting to the first receiver and receiving from the first transmitter in the base unit, the method comprising the steps of:

deactivating the second transmitter and reducing the on-time state of the second receiver while the handset unit is located remote from the base unit and in a standby state wherein no user initiated communications exists between the base unit and the handset unit; and measuring a period of time for which said handset unit is continually in the standby state, in response to said measured time period being less than a predetermined first time period, the deactivating step including the step of deactivating the second transmitter and cycling between the on-time state and an off-time state of the second receiver for a predetermined third time period, and in response to said measured time period being greater than the predetermined first time period, the deactivating step including the step of deactivating the second transmitter and cycling between the on-time state and the off-time state of the second receiver for a predetermined fourth time period, said fourth time period being greater than said third time period.

10. The method pursuant to claim 9 further including the step of storing a predetermined signal code in the base unit and the handset unit of the cordless telephone for transmission between the base unit and the handset unit in response to user initiated communications, the handset unit being unresponsive to user initiated communication attempts by the base unit unaccompanied by the signal code and remaining in the reduced on-time state, and the base unit being unresponsive to user initiated communication attempts from the handset unit unaccompanied by the signal code.

11. The method pursuant to claim 10 further including the steps of transmitting the signal code from the first transmitter to the second receiver in response to user initiated communications at the base unit; and changing the state of the second receiver from a reduced on-time state to a full-on operating state upon receipt of the coding signal.

12. The method pursuant to claim 11 further including the step of changing the state of the second transmitter from a deactivated state to a full-on operating state.

13. The method pursuant to claim 10 further including the step of changing the second receiver from a reduced on-time state to a full-on operating state in response to user initiated communications at the handset unit.

14. The method pursuant to claim 9 further including the step of establishing communications with the handset unit responsive to user initiated communications at the base unit while the handset unit is in the standby state, in response to said measured time period being less than the predetermined first time period, the establishing step causing said first transmitter to transmit a first header signal having a first period length, and in response to said measured time period being greater than the predetermined first time period, the establishing step causing said first transmitter to transmit a second header signal having a second period length, said second period length being greater than said first period length.

15. In a cordless telephone including a base unit with a first transmitter and a first receiver and a handset unit with a second transmitter and a second receiver for respectively transmitting to the first receiver and receiving from the first transmitter in the base unit, the handset unit comprising:

control means for deactivating the second transmitter and reducing an on-time state of the second receiver while located remote from the base unit and in a standby state wherein no user initiated communications exists between the base unit and the handset unit; and timer means for measuring a period of time for which said handset unit is continually in the standby state, in response to said measured time period being less than a predetermined first time period, the control means deactivating the second transmitter and cycling between the on-time state and an off-time state of the second receiver for a predetermined third time period, and in response to said measured time period being greater than the predetermined first time period, the control means deactivating the second transmitter and cycling between the on-time state and the off-time state of the second receiver for a predetermined fourth time period, said fourth time period being greater than said third time period.

16. The handset unit of claim 15 wherein said fourth time period is twice as long as said third time period.

17. The handset unit of claim 15 wherein said measured time period is 24 hours.

18. The handset unit of claim 15 wherein said timer means is a timer circuit.

19. In a cordless telephone including a base unit with a first transmitter and a first receiver and a handset unit with a second transmitter and a second receiver for respectively transmitting to the first receiver and receiving from the first transmitter in the base unit, the base unit comprising:

timer means for measuring a period of time for which said handset unit is continually in a standby state, said handset unit being in the standby state while located remote from the base unit and while no user initiated communications exists between the base unit and the handset unit; and control means responsive to user initiated communications at the base unit for establishing communications with the handset unit while the handset unit is in the standby state, in response to said measured time period being less than a predetermined first time period, the control means causing said first transmitter to transmit a first header signal having a first period length, and in response to said measured time period being greater than the predetermined first time period, the control means causing said first transmitter to transmit a second header signal having a second period length, said second period length of said second header signal being greater than said first period length of said first header signal.

20. The base unit of claim 19 wherein said period length of said second header signal is twice as long as said period length of said first header signal.

21. The base unit of claim 19 wherein said measured time period is 24 hours.

22. The base unit of claim 19 wherein said timer means is a timer circuit.

23. A method of communicating with a cordless telephone having a base unit with a first transmitter and a first receiver, and a handset unit with a second transmitter and a second receiver for respectively transmitting to the first receiver and receiving from the first transmitter in the base unit, the method comprising the steps of:

deactivating the second transmitter and reducing an on-time state of the second receiver while located remote from the base unit and in a standby state wherein no user initiated communications exists between the base unit and the handset unit; and measuring a period of time for which said handset unit is continually in the standby state, in response to said measured time period being less than a predetermined first time period, the deactivating step deactivating the second transmitter and cycling between the on-time state and an off-time state of the second receiver for a predetermined third time period, and in response to said measured time period being greater than the predetermined first time period, the deactivating step deactivating the second transmitter and cycling between the on-time state and the off-time state of the second receiver for a predetermined fourth time period, said fourth time period being greater than said third time period.

24. The method pursuant to claim 23 wherein said fourth time period is twice as long as said third time period.

25. The method pursuant to claim 23 wherein said measured time period is 24 hours.

26. The method pursuant to claim 23 wherein said timer means is a timer circuit.

27. A method of communicating with a cordless telephone having a base unit with a first transmitter and a first receiver, and a handset unit with a second transmitter and a second receiver for respectively transmitting to the first receiver and receiving from the first transmitter in the base unit, the method comprising the steps of:

measuring in the base unit a period of time for which said handset unit is continually in a standby state, said handset unit being in the standby state while located remote from the base unit and while no user initiated communications exists between the base unit and the handset unit; and establishing communications with the handset unit responsive to user initiated communications at the base unit while the handset unit is in the standby state, in response to said measured time period being less than a predetermined first time period, the establishing step causing said first transmitter to transmit a first header signal having a first period length, and in response to said measured time period being greater than the predetermined first time period, the establishing step causing said first transmitter to transmit a second header signal having a second period length, said second period length being greater than said first period length.

28. The method pursuant to claim 27 wherein said period length of said second header signal is twice as long as said period length of said first header signal.

29. The method pursuant to claim 27 wherein said measured time period is 24 hours.

30. The method pursuant to claim 27 wherein said timer means is a timer circuit.

* * * * *